United States Patent
Fleming et al.

(10) Patent No.: US 10,055,684 B2
(45) Date of Patent: Aug. 21, 2018

(54) SYSTEM AND METHOD FOR USING AN ARTIFICIAL NEURAL NETWORK TO SIMULATE PIPE HYDRAULICS IN A RESERVOIR SIMULATOR

(75) Inventors: Graham Fleming, Houston, TX (US); Terry Wong, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 329 days.

(21) Appl. No.: 13/980,608

(22) PCT Filed: Jan. 31, 2011

(86) PCT No.: PCT/US2011/023128
§ 371 (c)(1),
(2), (4) Date: Jul. 19, 2013

(87) PCT Pub. No.: WO2012/105934
PCT Pub. Date: Aug. 9, 2012

(65) Prior Publication Data
US 2013/0304679 A1  Nov. 14, 2013

(51) Int. Cl.
*G06F 15/18* (2006.01)
*G06N 3/08* (2006.01)
*G05B 13/02* (2006.01)
*G05B 17/02* (2006.01)
*E21B 43/00* (2006.01)

(52) U.S. Cl.
CPC .............. *G06N 3/08* (2013.01); *E21B 43/00* (2013.01); *G05B 13/027* (2013.01); *G05B 17/02* (2013.01)

(58) Field of Classification Search
CPC .... G06N 99/005; G06N 3/004; G06N 3/0436; G06N 3/086; G06Q 30/02
See application file for complete search history.

(56) References Cited

U.S. PATENT DOCUMENTS

| | | | |
|---|---|---|---|
| 5,845,271 A | 12/1998 | Thaler | |
| 5,862,513 A | 1/1999 | Mezzatesta et al. | |
| 6,115,701 A | 9/2000 | Thaler | |
| 6,236,894 B1 * | 5/2001 | Stoisits | G05B 13/027 700/28 |
| 6,269,351 B1 | 7/2001 | Black | |
| 6,655,221 B1 * | 12/2003 | Aspelund | G01F 1/363 73/861.04 |

(Continued)

OTHER PUBLICATIONS

"Prediction of Formation Damage During Fluid Injection into Fractured, Low Permeability Reservoirs via Neural Networks" Nikravesh et al, University of California at Berkeley, Lawrence Berkeley National Laboratory, CalResources, LLC SPE Members; Copyright 1996, Society of Petroleum Engineers.*

(Continued)

*Primary Examiner* — Luis Sitiriche

(57) ABSTRACT

A method for implementing a reservoir simulator is described. The method comprises developing training data by performing a calculation on an initial set of input data relating to reservoir conditions to obtain corresponding output data; training an artificial neural network ("ANN") to perform the calculation using the training data; and using the trained ANN to perform the calculation on a second set of input data to obtain corresponding output data for use by the reservoir simulator in performing simulations.

18 Claims, 4 Drawing Sheets

(56) References Cited

U.S. PATENT DOCUMENTS

| | | | |
|---|---|---|---|
| 7,231,305 B2* | 6/2007 | Stephenson | G01F 1/44 |
| | | | 702/45 |
| 2002/0152030 A1 | 10/2002 | Schultz et al. | |
| 2007/0179766 A1* | 8/2007 | Cullick | E21B 43/00 |
| | | | 703/10 |
| 2009/0020284 A1* | 1/2009 | Graf et al. | 700/266 |
| 2009/0294122 A1 | 12/2009 | Hansen et al. | |
| 2011/0270591 A1* | 11/2011 | Couet | G06F 17/11 |
| | | | 703/2 |

OTHER PUBLICATIONS

PCT International Preliminary Report and Written Opinion, dated Aug. 15, 2013, 7 pages; PCT/US2011/023128, The International Bureau of WIPO, 34, chemin des Colombettes, 1211 Geneva 20 Switzerland.

PCT International Search Report, mailing date of Search Report: dated Mar. 30, 2011, 4 pages PCT/US2011/023128, United States Patent and Trademark Office.

Australian Patent Examination Report, Patent Application No. 2011357784, dated Jan. 6, 2015, 3 pages.

European Patent Office, Supplementary European Search Report for EP11857923.4, 5 pages, dated Jan. 5, 2018.

El-Sayed, A. Osman and Mohamed A. Aggour, Artificial Neural Network Model for Accurate Prediction of Pressure Drop in Horizontal and Near-Horizontal-Multiphase Flow, Petroleum Science and Technology, Feb. 14, 2002, 14 pages, vol. 20 No. 1-2, King Fahd University of Petroleum & Minerals, Saudi Arabia.

G. Zahedi, A. Elkamel, A. Lohi, A. Jahanmiri, and M.R. Rahimpor, Hybrid artificial neural network—First principle model formulation for the unsteady state simulation and analysis of a packed bed reactor for CO2 hydrogenation to methanol, Chemical Engineering Journal, Nov. 7, 2005, 8 pages, vol. 115 No. 1-2, Elsevier.

Maria Mihet, Vasile Mircea Cristea, and Paul Serban Agachi, FCCU simulation based on first principle and artificial neural network models, Asia-Pacific Journal of Chemical Engineering, Jun. 29, 2009, 7 pages, vol. 4, No. 6.

* cited by examiner

SYSTEM AND METHOD FOR USING AN ARTIFICIAL NEURAL NETWORK TO SIMULATE PIPE HYDRAULICS IN A RESERVOIR SIMULATOR

BACKGROUND

Reservoir simulation is an area of reservoir engineering which employs computer models to predict the flow of fluids, such as petroleum, water, and gas, within the reservoir. Reservoir simulators are used by petroleum producers in determining how best to develop new fields, as well as in generating production forecasts on which investment decisions are based in connection with developed fields.

Reservoir simulators numerically model the flow of hydrocarbons and brines in reservoirs and the flow rates of fluids through the pipes and devices that comprise the gathering and injection facilities for the reservoir. One of the primary factors affecting flow rates calculated by reservoir simulators is pipe hydraulics, particularly the pressure drop in the pipes of the reservoir's gathering and injection facilities. Accordingly, pressure drop must be calculated accurately in order to precisely monitor and simulate reservoir flow rates.

In existing reservoir simulators, pressure drop data for gathering and injection facilities such as well tubing connections are either obtained from a look-up, or VLP, table or by calculating the pressure drop using pressure drop correlations. In the first approach, VLP tables are calculated by a program external to the simulator using pressure drop correlations. The VLP tables are multidimensional, providing pressure drop as a function of several variables. These variables typically include the surface flow rate of one phase, ratios such as water cut and gas/oil ratio, the pressure at one end of the pipe, and, for compositional simulations, some measure of compositional variation, such as key component mole fraction or mean molecular weight. This approach does not fully capture the dependence on the composition of the fluid (i.e., the mole fraction of each component in the fluid, which limits the usefulness of VPN tables for compositional simulations.

In the second approach, pressure drops are calculated during the simulation, using pressure drop correlations, so the compositional dependency is fully captured. However, this can be computationally expensive because the calculations must be performed numerous times during the simulations as the flow rates, fluid composition, and pressure change even if the values for flow rates, composition, and pressure are similar to previous calculations.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

Figure 1:
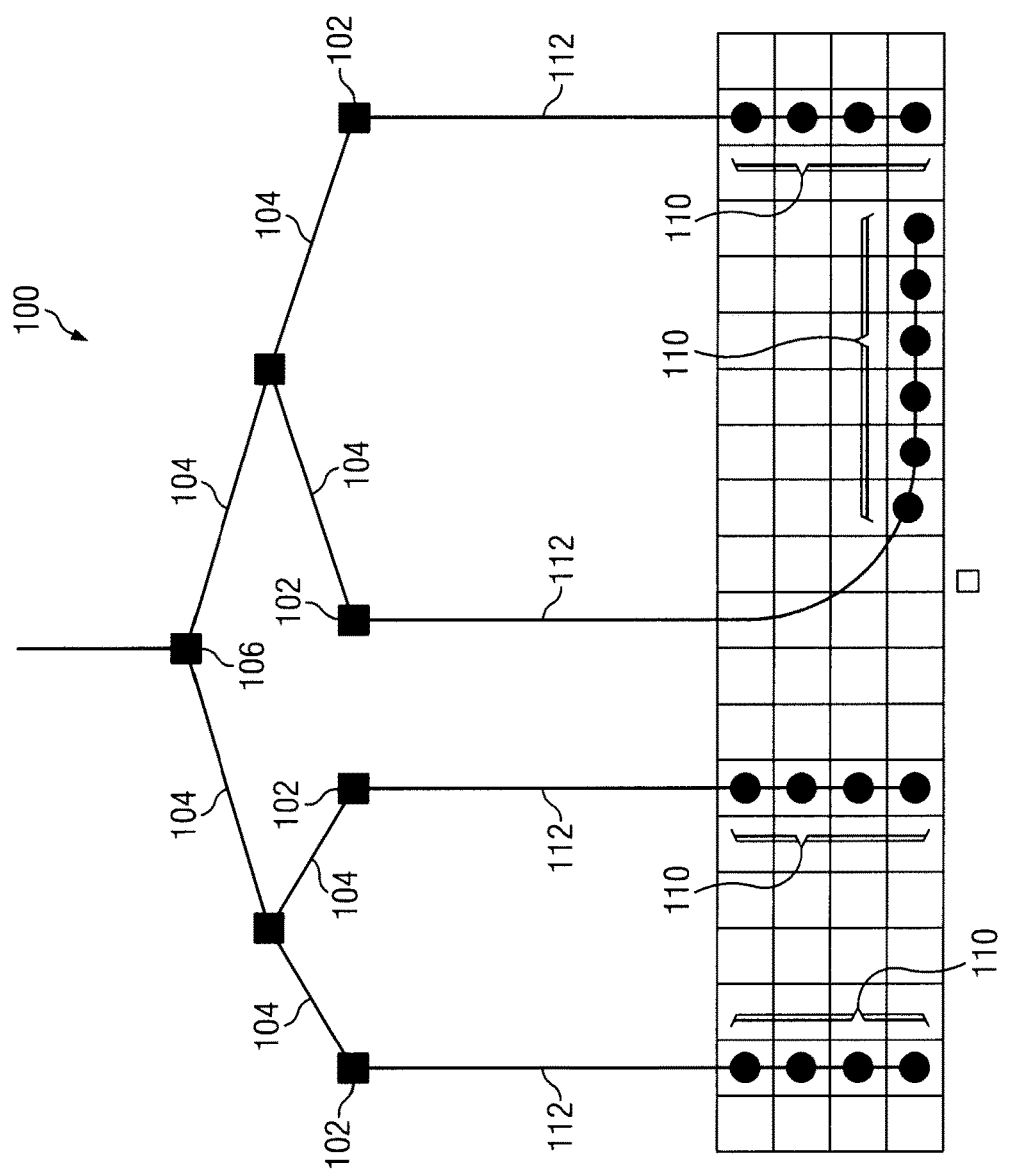
FIG. 1 illustrates an example of a reservoir simulation model comprising multiple wells.

In the detailed description of the embodiments, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

To overcome the above-noted and other limitations of the current approaches, one or more embodiments described herein comprise a reservoir simulator that employs an artificial neural network ("ANN") as a proxy model. Initially, as described below with reference to FIG. 5, one embodiment uses pressure drop correlations to calculate pressure drop data and stores the input data, including total mass (or molar) flow rates, the composition of the fluid (i.e., the mass or mole fraction of each component thereof), the pressure at either the inlet or outlet of the pipe, and the temperature of the fluid as a function of location in the pipe, and corresponding output data (i.e., pressure drop). Alternatively, the input data could comprise the mass or molar flow rate of each component, along with inlet or outlet pressure and temperature distribution. After several time steps, the corresponding input and output data are advantageously used to train the ANN. The prior input data may be extended by extrapolation and additional pressure drop calculations on the extrapolated data may be performed before training the ANN to extend the range over which the ANN will be accurate. Once the ANN has been trained, it may be used as a proxy model in a reservoir simulator to calculate pressure drops as a function of the current flow rates, pressures, and temperatures, and, if required by the simulator, to provide numeric derivatives by perturbing the input data about the current conditions. Periodically, or responsive to significant deviation of the input data from the range of the training data, full pressure drop calculations may be once again performed to ensure that the input data is still within a range in which the ANN provides sufficiently accurate results. Such periodic calculations may also be stored so that when the accuracy of the ANN becomes unacceptable, it is available to retrain the ANN. Calculating the pressure drop using the ANN, as opposed to having to utilize pressure drop correlations, will result in substantial savings in CPU-time. Additionally, the accuracy of the simulator will be superior to using VPN tables, given the limited ability thereof to capture compositional effects.

In many situations, it is common to run the same base simulation data, using slightly varying input, to evaluate alternative operating strategies, for example. To achieve an even greater advantage from the ANN, the final parameters for the trained ANN and the data used to train it could be output at the completion of the first simulation run and used in subsequent runs of the same base simulation model. As in the initial run, the accuracy of the ANN is checked to determine whether the input data deviated from the range of training data so the ANN could be retrained if subsequent runs resulted in significantly different conditions from the initial run.

The use of an ANN as a proxy model in a reservoir simulator may also provide the advantage of providing some smoothing to the calculated pressure drops. Pressure drop correlations typically have discontinuities due to changes in flow regimes, such as slug versus bubble flow. Usually, these discontinuities do not represent a real physical phenomenon, but rather a limitation of the correlation. Discontinuities are numerically undesirable because they can slow or even prevent convergence of the Newton iteration schemes commonly used in reservoir simulators.

FIG. 1 illustrates an example of a reservoir simulation model 100 comprising four wells 102, and a network of surface pipes 104 connecting the wells to a terminal 106. Each of the wells 102 is connected to a respective completion 110 via tubing 112.

Figure 2:
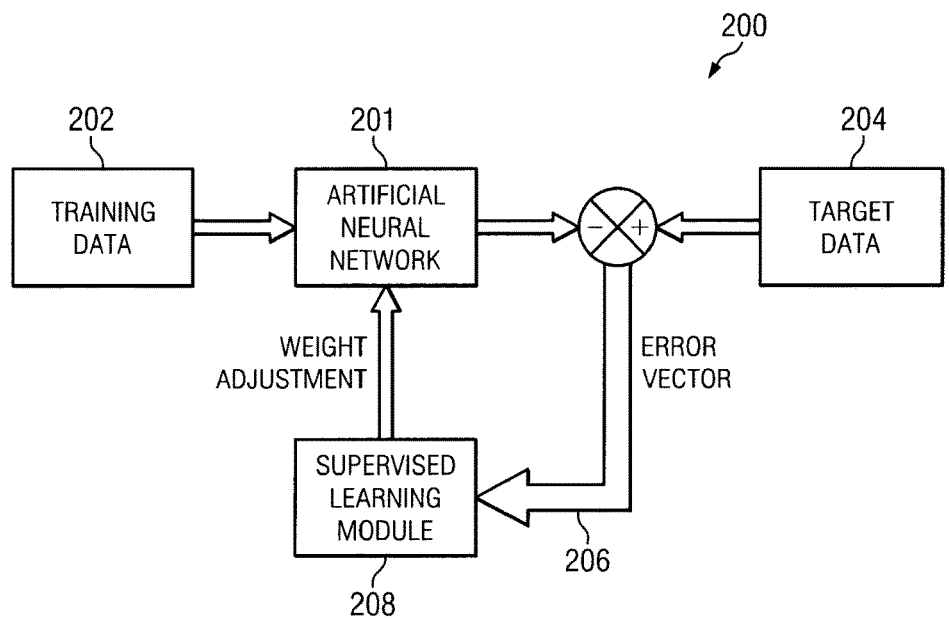
FIG. 2 is a block diagram of an exemplary system for training an ANN in accordance with one embodiment.
Figure 5:
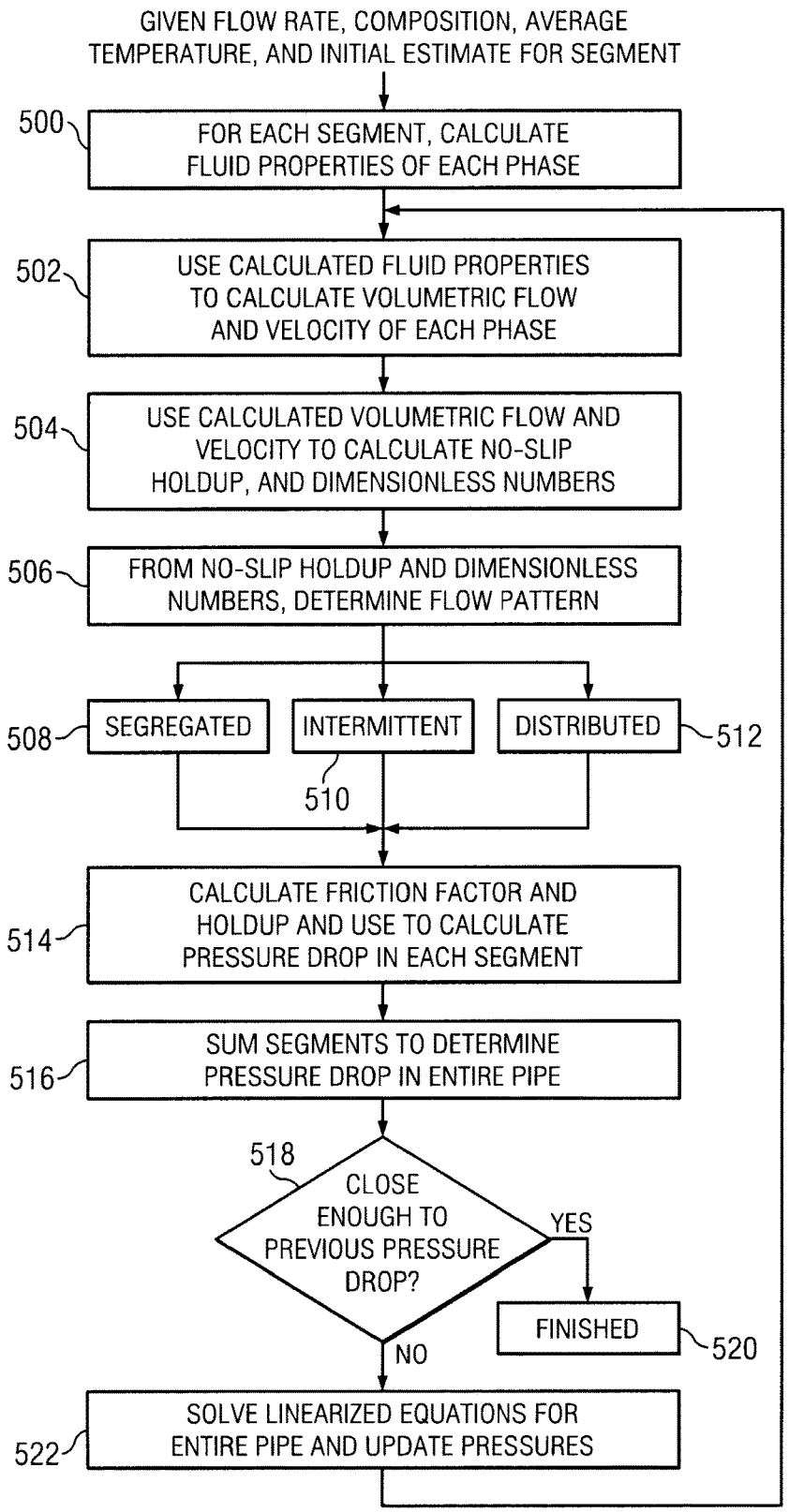
FIG. 5 is a flowchart of a pressure drop calculation using Beggs and Brill correlation in accordance with one embodiment.

FIG. 2 is a block diagram of an exemplary system 200 for training an artificial neural network ("ANN") 201 for simulating a reservoir, such as represented by the model 100 (FIG. 1), in accordance with one embodiment. For purposes of example, it will be assumed that the ANN 201 is being trained to function as a proxy model for use in a reservoir simulator to calculate pressure drops as a function of the current flow rates, pressures, and temperatures, and, if required by the simulator, to provide numeric derivatives by perturbing the input data about the current conditions. In particular, training data 202, derived as shown in FIG. 5, is input to the ANN 201, the output of which is matched with target data 204 and used to generate an error vector 206. A supervised learning module 208 utilizes the received error vector 206 to adjust the weights of the ANN 201 as necessary. This process repeats until the ANN 201 has converged, i.e., until the error vector is determined to be within a predefined range. At this point, the ANN 201 is considered to have been "trained". During training, the training data input to the ANN 201 comprises the input data described above for calculating pressure drop and the corresponding target data comprises the pressure drop calculated using pressure drop correlations during development of the training data.

It will be further recognized that the training data 202 and target data 206 may be stored in one or more databases and/or other types of memory and that the ANN 201 is implemented via one or more processors executing instructions stored on a computer-readable storage medium. Additionally, although not shown, it is understood that the system 200 may also comprise various input and/or output devices for enabling a user to interact with the ANN training process at various points thereof and may comprise one or more computer-implemented modules for performing various functions of the system. Moreover, although one method of training the ANN 201 is illustrated in FIG. 2, it will be recognized that any number of different known training methods (e.g., evolutionary, simulated annealing, expectation-maximization, and non-parametric methods) and/or types (e.g., feed-forward and recurrent) of ANNs may be used to train and implement the ANN.

Figure 3:
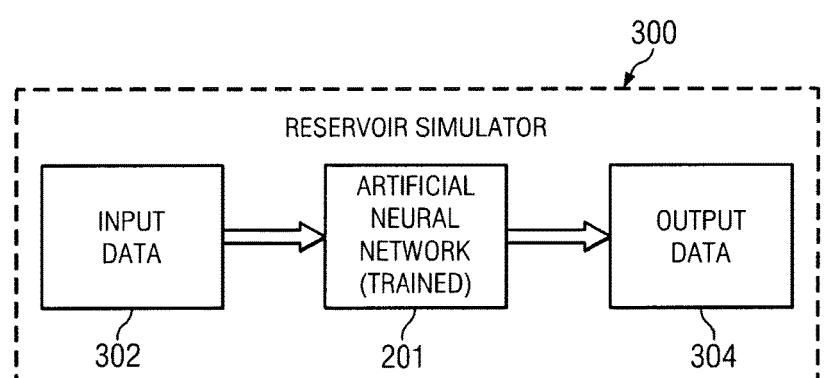
FIG. 3 is a block diagram of an exemplary embodiment of a portion of a reservoir simulator implemented using the trained ANN of FIG. 2.

FIG. 3 is a block diagram of an exemplary embodiment of a portion of a reservoir simulator 300 implemented using the ANN 201 (after it has been trained as described with reference to FIG. 2). As illustrated in FIG. 3, responsive to input data 302, including flow rates, fluid composition, pressure, and temperature, the ANN 201 produces output data 304, i.e., corresponding pressure drop calculations. It will be recognized that the input data 302 and output data 304 may be stored in one or more databases and/or other types of memory and that the simulator 300 and the ANN 201 are implemented via one or more processors executing instructions stored on a computer readable medium. Additionally, although not shown, it is understood that the simulator 300 may also comprise various input and/or output devices for enabling a user to interact with the ANN training process at various points thereof.

Figure 4:
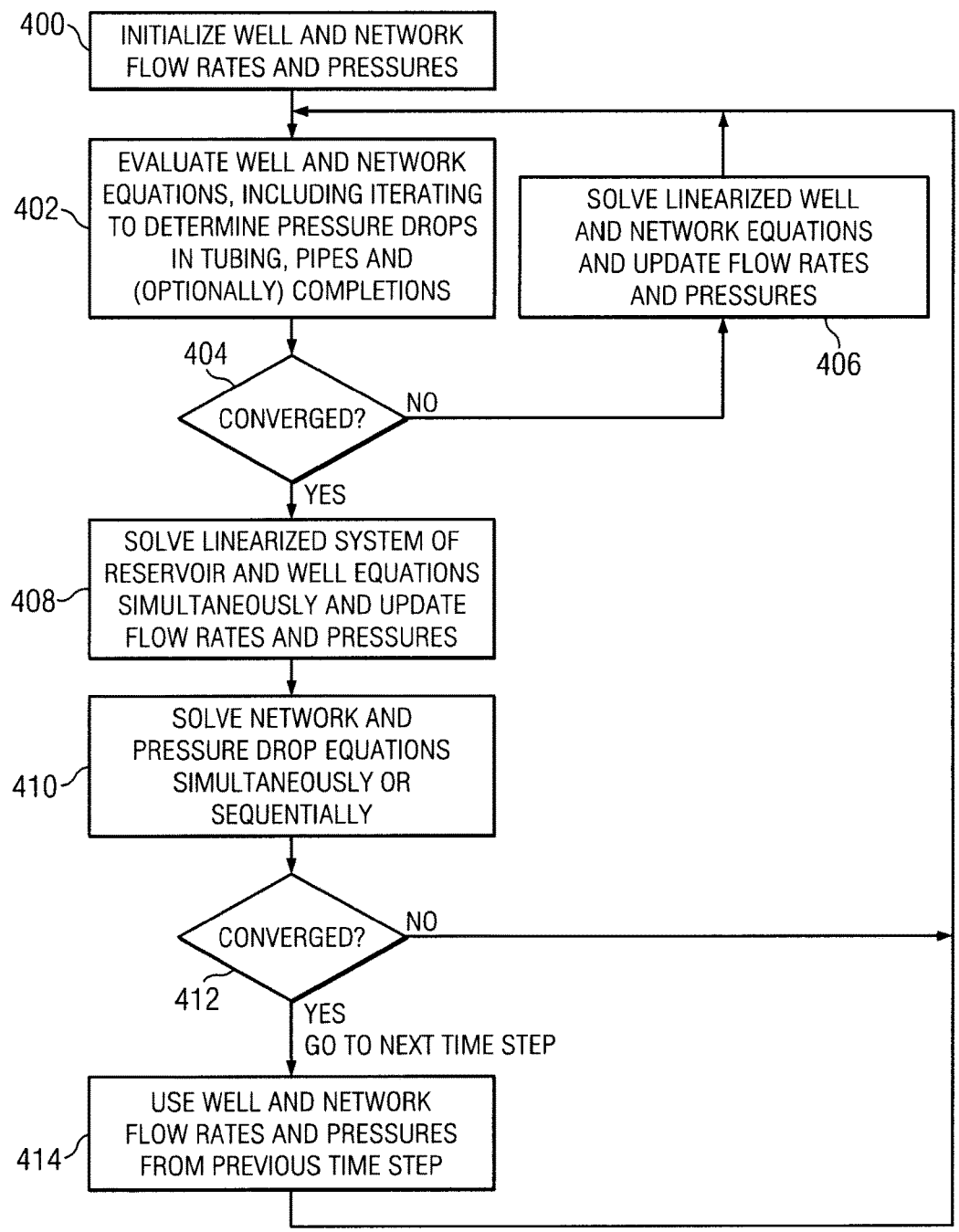
FIG. 4 is a flowchart of an embodiment of an iterative solution procedure implemented by a reservoir simulator, such as the reservoir simulator of FIG. 3.

Referring now to FIG. 4, illustrated therein is a flowchart of an embodiment of an iterative solution procedure in a reservoir simulator. In step 400, well and network flow rates and pressures are initialized using either the solution from the preceding time step or an arbitrary estimate based on typical flow rates and pressure drops from the reservoir to the wellbore. In step 402, the well and network equations are evaluated using the reservoir pressure and the fluid mobilities in the reservoir as fixed boundary conditions and the flow rates and pressures from the initial estimate or the previous iteration. The network equations may include pressure drop equations, component mass balances, rate and pressure constraint equations and other equations. This step may include iterating to determine pressure drops in tubing, pipes, and (possibly) completions. In step 404, a determination is made whether the solution has converged. In general, the solution is converged when the pressure drop calculated using the current flow rates and pressures agrees within a small tolerance with the difference in pressure between the inlet and outlet of each connection in the network, all the rate and pressure constraints are satisfied (i.e., either exactly met or not exceeded), the mass balances are satisfied within a small tolerance, and any other equations, such as separator equations, are also satisfied within a small tolerance. If not, execution proceeds to step 406, in which linearized well and network equations are solved and flow rates and pressures are updated, at which point execution returns to step 402. Once a determination is made in step 404 that the solution has converged, execution proceeds to step 408.

In step 408, the linearized system of reservoir and well equations are solved simultaneously and flow rates and pressures are updated. It will be noted that network and pressure drop equations may be solved simultaneously or sequentially. In step 410, a determination is made whether the solution has converged. If not, execution returns to step 402; otherwise, execution proceeds to step 412, in which the well and network flow rates calculated in the immediately preceding time step are accessed for use and execution returns to step 404.

There are at least two well-known prior art approaches to calculating the pressure drop in a pipe. In either approach, the pipe, tubing, or completion, is divided into multiple segments. In the first approach, the pipe is finely segmented and the pressure drop calculations are performed without iteration by calculating the pressure drop in each pipe segment. In this approach, one end of the pipe segment is chosen as the starting point and the pressure at that end of the pipe segment is used as a boundary condition. The fluid properties are evaluated at that pressure and the properties are used to calculate the pressure at the other end of the pipe segment. The calculated pressure becomes the boundary condition for the next pipe segment. The second approach segments the pipe more coarsely and evaluates the fluid properties at the average pressure of the pipe segment then iterates until the pressures converge.

Referring now to FIG. 5, illustrated therein is a flowchart of pressure drop calculation using Beggs and Brill correlation in accordance with one embodiment. Given flow rate, composition, average temperature, and initial estimate of segment pressure drops, for each segment, in step 500, the equation of state or other PVT model is used to calculate fluid properties (such as density and viscosity) of each phase (e.g., oil, gas, and water). In step 502, the properties calculated in step 500 are used to calculate volumetric flow and velocity of each phase. In step 504, the no-slip holdup, which is the ratio of liquid volumetric flow to total volumetric flow, and dimensionless numbers (such as Reynold's number) are calculated. In step 506, the flow pattern is determined from the no-slip hold-up and dimensionless numbers. For example, in one embodiment, the flow pattern may be segregated (508), intermittent (510) or distributed (512). In step 514, the friction factor and holdup are calculated and used to calculate the pressure drop in each segment. In step 516, the segments are summed to obtain the pressure drop for the entire pipe.

In step 518, a determination is made whether the pressure drop in the pipe is close within a small tolerance to the previously calculated pressure drop. If so, execution terminates in step 520; otherwise, execution proceeds to step 522, in which linearized equations are solved for the whole pipe and pressures are updated. Execution then returns to step 502.

It will be recognized that the process illustrated in FIG. 5 is used to develop initial training data (i.e., input and output data) for training the ANN, as illustrated in FIG. 2. Once the ANN is trained, the ANN itself is used to perform the process illustrated in FIG. 5.

While certain features and embodiments of the invention have been described in detail herein, it will be readily understood that the invention encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the invention.

For example, although the ANN is described as being used as a proxy model for simulating pipe hydraulics in a reservoir simulator, the ANN may be used to model other features within the reservoir for producing data for use by the simulator. Additionally, although a specific method of training the ANN has been described, any one of a number of different known training methods, and corresponding types of ANNs, may be used to train and implement the ANN 201. Moreover, while the pressure drop calculations are shown and described as being performed using Beggs and Brill correlations, it will be recognized that other correlations, such as Hagedorn & Brown, Dukler I I, Dunns & Ross, Orkiszewski, and Griffith, may be advantageously used. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method comprising:
retrieving, by one or more processors from a data store, an initial set of input data relating to a current flow of fluids through a pipe disposed within a wellbore for producing hydrocarbons from a reservoir to gathering and injection facilities located at a surface of the wellbore;
developing training data by performing a calculation on the initial set of input data to obtain corresponding output data relating to current reservoir conditions;
training an artificial neural network ("ANN") to function as a proxy model for simulating pipe hydraulics in each of a plurality of segments of the pipe within the wellbore, based on the training data;
using the trained ANN to perform the calculation on a second set of input data relating to the current reservoir conditions to obtain corresponding output data for use by the reservoir simulator in performing simulations of pipe hydraulics for the segments of the pipe represented in the reservoir simulator, the calculation being performed for each of the plurality of segments of the pipe by:
determining a flow pattern for the pipe segment based on the second set of input data relating to the current reservoir conditions;
calculating a friction factor and a no-slip holdup for the pipe segment, based on the flow pattern; and
calculating the output data for the reservoir simulator, based on the friction factor and no-slip holdup calculated for the pipe segment, wherein the output data includes pressure drops calculated for each pipe segment, the pressure drops calculated for each pipe segment are summed to determine pressure drop in the pipe as a whole, and the use of the trained ANN as a proxy model in the reservoir simulator provides smoothing to the calculated pressure drops so as to account for discontinuities in the pipe due to changes in flow regimes in the plurality of pipe segments;
estimating a flow rate of hydrocarbons from the reservoir based on the simulations performed by the reservoir simulator;
determining an operating strategy for producing hydrocarbons from the reservoir to the gathering and injection facilities at the surface of the wellbore, based upon the estimated flow rate; and
performing hydrocarbon production from the reservoir, based on the determined operating strategy.

2. The method of claim 1, wherein each of the initial set of input data and the second set of input data comprises at least one of a flow rate, fluid composition, inlet pressure, outlet pressure, and fluid temperature distribution.

3. The method of claim 1 further comprising, prior to the training, extending the initial set of input data by extrapolation.

4. The method of claim 1 further comprising, subsequent to the using, retraining the ANN.

5. The method of claim 4 wherein the retraining is performed responsive to a determination that accuracy of the ANN has fallen below an acceptable level.

6. The method of claim 4 wherein the retraining is performed periodically.

7. The method of claim 1 further comprising using the ANN to provide numeric derivatives by perturbing the second set of input data about current conditions.

8. The method of claim 1 wherein, subsequent to a first run of the reservoir simulator employing the ANN, reusing the initial set of input data and corresponding output data in a subsequent run of the reservoir simulator using the ANN.

9. A non-transitory computer-readable medium having stored thereon instructions executable by a processor to perform a method comprising:
retrieving, from a data store, an initial set of input data relating to a current flow of fluids through a pipe disposed within a wellbore for producing hydrocarbons from a reservoir to gathering and injection facilities located at a surface of the wellbore;
developing training data by performing a calculation on the initial set of input data to obtain corresponding output data relating to current reservoir conditions;
training an artificial neural network ("ANN") to function as a proxy model for simulating pipe hydraulics in each of a plurality of segments of the pipe within the wellbore, based on the training data;

using the trained ANN to perform the calculation on a second set of input data relating to the current reservoir conditions to obtain corresponding output data for use by the reservoir simulator in performing simulations of pipe hydraulics for the segments of the pipe represented in the reservoir simulator, the calculation being performed for each of the plurality of segments of the pipe by:

determining a flow pattern for the pipe segment based on the second set of input data relating to the current reservoir conditions;

calculating a friction factor and a no-slip holdup for the pipe segment, based on the flow pattern; and calculating the output data for the reservoir simulator, based on the friction factor and no-slip holdup calculated for the pipe segment, wherein the output data includes pressure drops calculated for each pipe segment, the pressure drops calculated for each pipe segment are summed to determine pressure drop in the pipe as a whole, and the use of the trained ANN as a proxy model in the reservoir simulator provides smoothing to the calculated pressure drops so as to account for discontinuities in the pipe due to changes in flow regimes in the plurality of pipe segments;

estimating a flow rate of hydrocarbons from the reservoir based on the simulations performed by the reservoir simulator; and determining an operating strategy for producing hydrocarbons from the reservoir to the gathering and injection facilities at the surface of the wellbore, based upon the estimated flow rate, wherein hydrocarbon production from the reservoir is performed based on the determined operating strategy.

10. The non-transitory computer-readable medium of claim 9 wherein the ANN comprises a proxy model for simulating pipe hydraulics, wherein each of the initial set of input data and the second set of input data comprises at least one of a flow rate, fluid composition, inlet pressure, outlet pressure, and fluid temperature distribution.

11. The non-transitory computer-readable medium of claim 9 wherein the method further comprises, prior to the training, extending the initial set of input data by extrapolation.

12. The non-transitory computer-readable medium of claim 9 wherein the method further comprises retraining the ANN responsive to a determination that accuracy of the ANN has fallen below an acceptable level.

13. The non-transitory computer-readable medium of claim 9 wherein the method further comprises using the ANN to provide numeric derivatives by perturbing the second set of input data about current conditions.

14. The non-transitory computer-readable medium of claim 9 wherein the method further comprises, subsequent to a first run of the reservoir simulator employing the ANN, reusing the initial set of input data and corresponding output data in a subsequent run of the reservoir simulator using the ANN.

15. A system comprising:
a processor; and
a memory coupled to the processor, the memory storing instructions, which when executed by the processor cause the processor to perform a plurality of functions, including functions to:

retrieve, by one or more processors from a data store, an initial set of input data relating to a current flow of fluids through a pipe disposed within a wellbore for producing hydrocarbons from a reservoir to gathering and injection facilities located at a surface of the wellbore;

develop training data by performing a calculation on the initial set of input data to obtain corresponding output data relating to current reservoir conditions;

train an artificial neural network ("ANN") to function as a proxy model for simulating pipe hydraulics in each of a plurality of segments of the pipe within the wellbore, based on the training data;

use the trained ANN to perform the calculation on a second set of input data relating to the current reservoir conditions to obtain corresponding output data for use by the reservoir simulator in performing simulations of pipe hydraulics for the segments of the pipe represented in the reservoir simulator, the calculation being performed for each of the plurality of segments of the pipe by:

determining a flow pattern for the pipe segment based on the second set of input data relating to the current reservoir conditions;

calculating a friction factor and a no-slip holdup for the pipe segment, based on the flow pattern; and calculating the output data for the reservoir simulator, based on the friction factor and no-slip holdup calculated for the pipe segment, wherein the output data includes pressure drops calculated for each pipe segment, the pressure drops calculated for each pipe segment are summed to determine pressure drop in the pipe as a whole, and the use of the trained ANN as a proxy model in the reservoir simulator provides smoothing to the calculated pressure drops so as to account for discontinuities in the pipe due to changes in flow regimes in the plurality of pipe segments;

estimate a flow rate of hydrocarbons from the reservoir based on the simulations performed by the reservoir simulator; and determine an operating strategy for producing hydrocarbons from the reservoir to the gathering and injection facilities at the surface of the wellbore, based upon the estimated flow rate, wherein hydrocarbon production from the reservoir is performed based on the determined operating strategy.

16. The system of claim 15, wherein the ANN comprises a proxy model for simulating pipe hydraulics, wherein each of the initial set of input data and the second set of input data comprises at least one of a flow rate, fluid composition, inlet pressure, outlet pressure, and fluid temperature distribution, and wherein the output data comprises a pressure drop.

17. The system of claim 15, wherein the instructions performed by the processor further include functions to extend the initial set of input data by extrapolation prior to training the ANN.

18. The system of claim 15, wherein the instructions performed by the processor further include functions to retrain the ANN.

* * * * *